United States Patent
Mese et al.

(10) Patent No.: US 11,848,791 B2
(45) Date of Patent: Dec. 19, 2023

(54) DETECTION AND PRESENTATION OF VIDEO CONFERENCE ATTENDEE DIFFERENT FROM LOGGED-IN ATTENDEES

(71) Applicant: Lenovo (Singapore) Pte. Ltd., Singapore (SG)

(72) Inventors: John C. Mese, Cary, NC (US); Nathan Peterson, Oxford, NC (US); Arnold Weksler, Raleigh, NC (US); Mark Delaney, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/696,821

(22) Filed: Mar. 16, 2022

(65) Prior Publication Data
US 2023/0299990 A1 Sep. 21, 2023

(51) Int. Cl.
*H04L 12/18* (2006.01)
*G06V 40/16* (2022.01)
*G10L 17/22* (2013.01)

(52) U.S. Cl.
CPC ........ *H04L 12/1822* (2013.01); *G06V 40/164* (2022.01); *G06V 40/166* (2022.01); *G10L 17/22* (2013.01); *H04L 12/1831* (2013.01)

(58) Field of Classification Search
CPC ............ H04L 12/1822; H04L 12/1831; G06V 40/166; G06V 40/164; G10L 17/22
See application file for complete search history.

(56) References Cited

U.S. PATENT DOCUMENTS

| | | | |
|---|---|---|---|
| 9,106,717 B2 | 8/2015 | Nicholson et al. | |
| 2005/0227677 A1* | 10/2005 | Kallio | H04L 67/34 455/414.3 |
| 2013/0226645 A1* | 8/2013 | Renaghan | G06Q 10/1095 705/7.19 |
| 2013/0227007 A1* | 8/2013 | Savage | G06Q 10/101 709/204 |
| 2014/0164510 A1* | 6/2014 | Abuelsaad | G06Q 10/109 709/204 |
| 2015/0350372 A1* | 12/2015 | Griffin | H04L 43/045 348/14.07 |
| 2016/0330146 A1* | 11/2016 | Yoo | H04L 12/1827 |
| 2018/0278605 A1* | 9/2018 | Fitterer | H04L 12/1822 |
| 2020/0174753 A1* | 6/2020 | Binal | G06Q 10/1095 |

* cited by examiner

*Primary Examiner* — John A Follansbee
*Assistant Examiner* — Raqiul A Choudhury
(74) *Attorney, Agent, or Firm* — John L. Rogitz; John M. Rogitz (57) ABSTRACT

In one aspect, a device may include at least one processor and storage accessible to the at least one processor. The storage may include instructions executable by the at least one processor to determine whether a first number of video conference attendees detected via input from one or more sensors is greater than a second number of logins to the video conference. The instructions may then be executable to present a graphical element on a display during the video conference responsive to determining that the first number is greater than the second number. The graphical element may indicate a first attendee that is detected via the one or more sensors but that is not associated with a login to the video conference.

20 Claims, 5 Drawing Sheets

DETECTION AND PRESENTATION OF VIDEO CONFERENCE ATTENDEE DIFFERENT FROM LOGGED-IN ATTENDEES

FIELD

The disclosure below relates to technically inventive, non-routine solutions that are necessarily rooted in computer technology and that produce concrete technical improvements. In particular, the disclosure below relates to techniques for detection and presentation of a video conference attendee different from logged-in attendees.

BACKGROUND

As recognized herein, video conferences present a unique set of issues that do not necessarily arise with in-person conferences. Among these issues is that, often times, a single device is used to login to a video conference but two or more attendees use that single device to participate in the video conference. The other attendees that are remotely-located might then only see one video box for the two or more attendees. This in turn can lead to confusion as to how many people are actually in on the conference, who is speaking from among the people all using the same device, whom to address in response to a comment, etc. These things can create issues where confidentiality amongst the attendees and/or digital security is desired, particularly as the work-from-home and work-from-anywhere movements gain steam. There are currently no adequate solutions to the foregoing computer-related, technological problem.

SUMMARY

Accordingly, in one aspect a device includes at least one processor and storage accessible to the at least one processor. The storage includes instructions executable by the at least one processor to determine a first number of people attending a video conference, determine a second number of logins to the video conference, and determine whether the first number matches the second number. Based on a determination that the first number does not match the second number, the instructions are executable to present an indication on a display. The indication indicates a person determined to be attending the video conference but not associated with a login to the video conference.

Thus, in some example implementations the first number of people may be determined based on input from one or more cameras. The person may be identified from the input using facial recognition. Additionally or alternatively, the indication may be a placeholder indication and the instructions may be executable to present the placeholder indication responsive to not being able to identify the person using the input, with the placeholder indication indicating the person but not by name.

Also in some example implementations, the first number of people may be determined based on input from one or more microphones. The person may be identified from the input using voice recognition. Additionally or alternatively, the indication may be a placeholder indication and the instructions may be executable to present the placeholder indication responsive to not being able to identify the person using the input, with the placeholder indication indicating the person but not by name. Still further, in some examples the person may be identified from the input based on a verbal introduction indicating the person, where the verbal introduction may be indicated in the input.

Still further, in addition to or in lieu of the foregoing, the first number of people may be determined in various examples based on input from one or more presence sensors. The one or more presence sensors may include one or more infrared transceivers, one or more ultrasonic transceivers, and/or one or more time of flight sensors. Also in addition to or in lieu of the foregoing, the first number of people may be determined based on input from one or more wireless communication transceivers.

If desired, in some example embodiments the device may include the display.

In another aspect, a method includes determining whether a first number of video conference attendees detected via input from one or more sensors is different from a second number of logins to the video conference. The method also includes creating a first attendee profile that is in addition to respective attendee profiles for each login to the video conference responsive to determining that the first number is different from the second number. The method further includes presenting an indication of the first attendee profile on a display during the video conference.

In various examples, the one or more sensors may include one or more cameras, one or more microphones, one or more wireless communication transceivers, and/or one or more presence sensors.

Also in various examples, the first attendee profile may include data indicating an actual name for an attendee associated with the first attendee profile and/or a placeholder name for the attendee associated with the first attendee profile.

Still further, if desired in some example implementations the method may include identifying an attendee by name based on the input, determining contact information for the attendee based on the identifying of the attendee by name, including the contact information in the first attendee profile, and presenting the contact information as part of the indication.

Also if desired, the first attendee profile may be a temporary profile maintained during the video conference, and the method may include ceasing to maintain the first attendee profile based on conclusion of the video conference. In some specific examples, the method may even include ceasing to maintain the first attendee profile but saving data to persistent storage, where the data may be related to an attendee associated with the first attendee profile.

In still another aspect, at least one computer readable storage medium (CRSM) that is not a transitory signal includes instructions executable by at least one processor to determine whether a first number of video conference attendees detected via input from one or more sensors is greater than a second number of logins to the video conference. Responsive to determining that the first number is greater than the second number, the instructions are executable to present a graphical element on a display during the video conference. The graphical element indicates a first attendee that is detected via the one or more sensors but that is not associated with a login to the video conference.

In some example implementations, the instructions may be executable to create a temporary attendee profile for the video conference responsive to determining that the first number is greater than the second number. The temporary attendee profile may be in addition to respective profiles for each login to the video conference.

Also in some example implementations, the input may be first input and the instructions may be executable to receive second input to a graphical user interface (GUI) during the video conference. The second input may indicate an identifier for the first attendee as designated by a second attendee using the GUI. Based on receiving the second input, the instructions may then be executable to include the identifier as part of the graphical element.

The details of present principles, both as to their structure and operation, can best be understood in reference to the accompanying drawings, in which like reference numerals refer to like parts, and in which:

DETAILED DESCRIPTION

Among other things, the detailed description below adds device intelligence to conferencing-capable devices to detect when more people are attending a meeting than are individually logged in.

The detection may occur in a number of ways in cooperation with devices that are logged in to the online meeting. For example, cameras may be used that belong to the conference room, belong to a smart/conferencing device, or even that belong to individual personal devices in the room. Human presence detection (HPD) sensors may also be used so that, for example, presence sensors in the room and/or used as part of HPD function on individual personal devices (e.g., TOF, infrared, ultrasonic) may be employed.

As yet another example, microphones and voice detection may be used to monitor how many different voices are detected and compare that to the number of individuals logged in to the meeting. Voice transcription may also be used to parse the speech or transcription feed, for example during introductions (e.g., "This is the Shanghai team, I'm here with Sue and Ray") where the device identifies Sue and Ray as participants even if they have not themselves spoken yet as part of the conference.

Device detection may also be used so that, for example, one device might detect via wireless signal the presence of additional devices, implying additional people in on the video conference.

The number of detected attendees may then be provided to a software agent and/or to the conferencing software itself for additional processing. Thus, if the number of detected individuals is larger than the number logged in to the meeting, then the data may be provided to an identification engine.

Identification of individuals not logged in to the meeting but present and attending may occur in a number of ways, including face recognition using camera data. Positional information provided by sensors may also be used. Voice recognition may be used as well, e.g., if voice ID data is available. Names may also be parsed from transcription of the video conference and then a human resources document or other database may be looked up to ID the person from the database based on the name identified from the transcription. Metadata and other info from past conferences may also be used, such as a list of attendees from a previous meeting that may be used to match a past attendee to a current attendee as being the same person (with certain identifying information about the person already being indicated in the metadata). Wireless signal ID may also be used where a detected device is already registered to certain user. Other previous histories may also be used where the individual was identified in part or in whole.

Thus, if non-logged-in attendees can be identified with high confidence by the device or conferencing system, then a virtual attendee may be created in the meeting for each non-logged-in attendee but appear distinct from users who are actually logged in. And since the non-logged-in attendee was positively identified, contact information can be filled in so that the non-logged-in attendee can be addressed/engaged with by others. If, however, a non-logged-in attendee was not positively identified for some reason, then a placeholder could still be generated by the system to denote their presence to the other (logged-in) attendees. Information about the placeholder user could still be made available to the other attendees though (e.g., a camera snapshot of the non-logged-in person, "person to left" of identified attendee indication, "unknown voice 3" indication, "unknown device 3" indication, etc.). Moreover, if another attendee knows enough to ID the non-logged-in attendee themselves, that person might even add ID information about the non-logged-in attendee and that ID information may even be stored for future use in another conference in addition to the video conference at hand.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
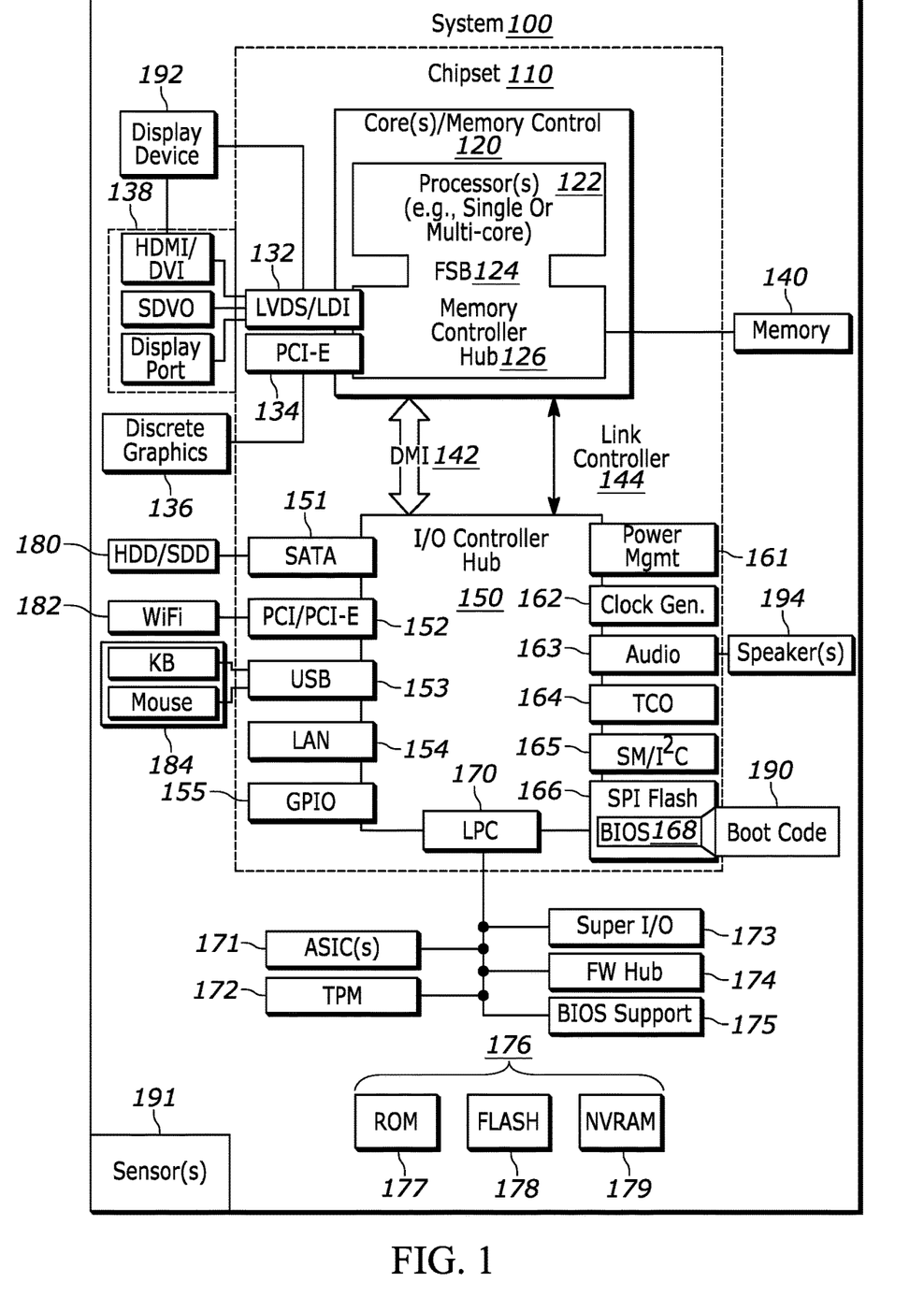
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, an audio receiver/microphone that provides input from the microphone to the processor 122 based on audio that is detected, such as via a user providing audible input to the microphone as part of a video conference. The sensors 191 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video for video conferencing and other purposes. The sensors 191 may also include one or more wireless communication transceivers, such as a Bluetooth transceiver, an ultra-wideband transceiver, a Wi-Fi transceiver, or even a global positioning system (GPS) transceiver. The GPS transceiver may be configured to communicate with at least one satellite to receive/identify geographic position information and provide the geographic position information to the processor 122. However, it is to be understood that another suitable wireless communication transceivers may be used in accordance with present principles.

Still further, in some examples the sensors 191 may include additional presence sensors such as one or more infrared (IR) time of flight transceivers, one or more ultrasonic transceivers, or one or more other time of flight sensors such as lidar sensors.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122.

It is to be understood that an example client device or other machine/computer may include fewer or more features than shown on the system 100 of FIG. 1. In any case, it is to be understood at least based on the foregoing that the system 100 is configured to undertake present principles.

Figure 2:
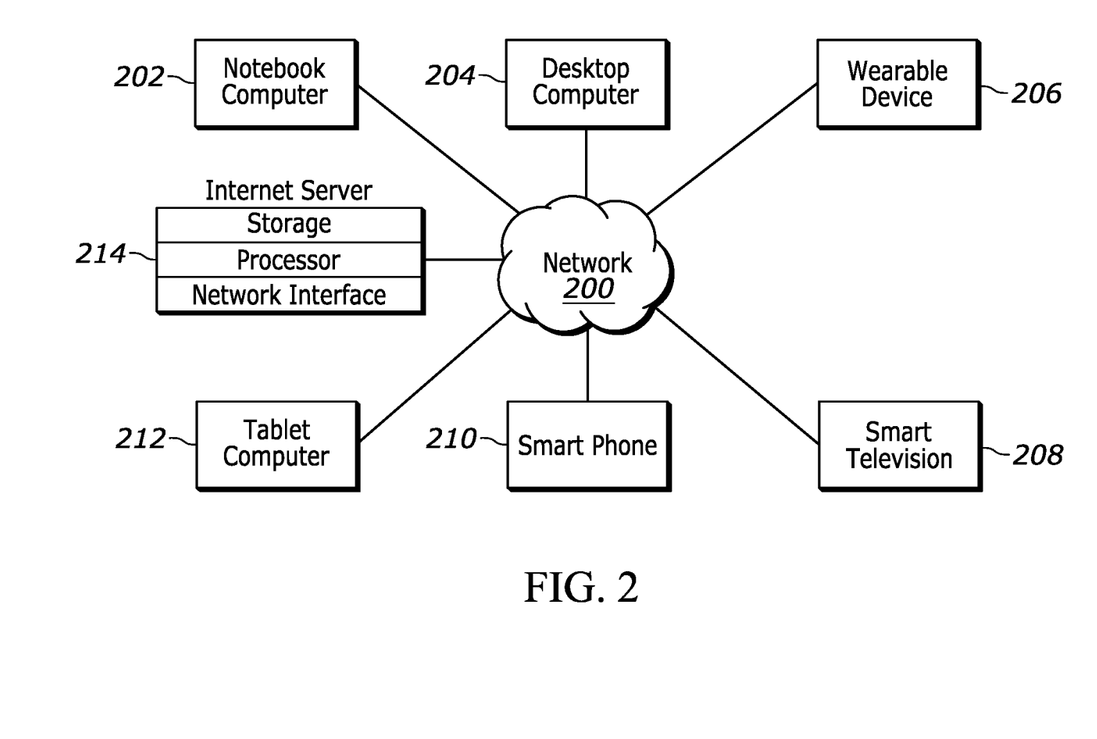
FIG. 2 is a block diagram of an example network of devices consistent with present principles.

Turning now to FIG. 2, example devices are shown communicating over a network 200 such as the Internet in accordance with present principles such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212 and route communications between the other devices 202-212 as part of video conferencing (e.g., routing audio/video feeds and metadata). It is to be understood that the devices 202-214 may be configured to communicate with each other over the network 200 to undertake present principles.

Figure 3:
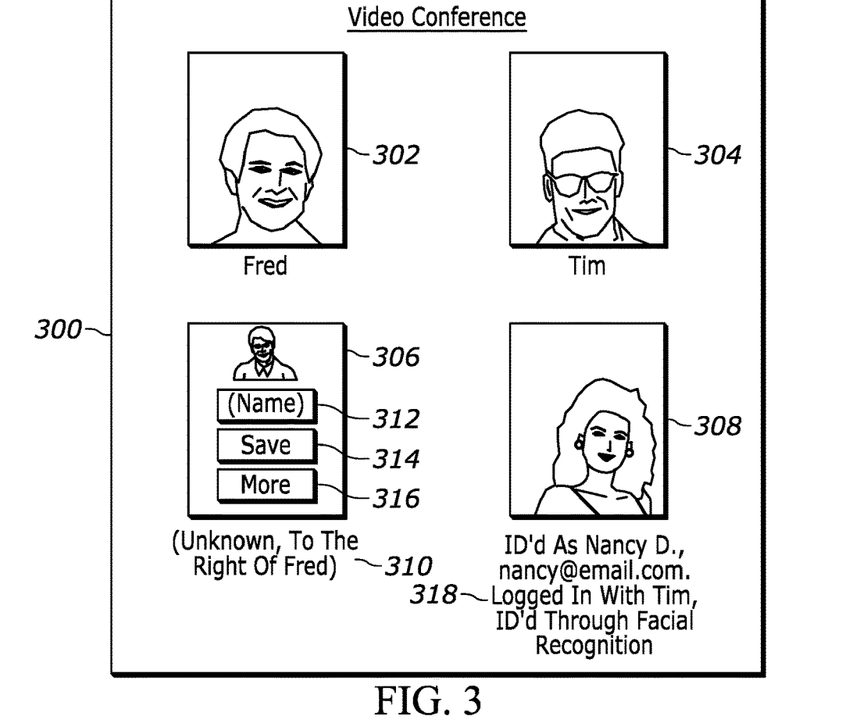
FIG. 3 shows an example video conference graphical user interface (GUI) that may be presented during a video conference consistent with present principles.

Now in reference to FIG. 3, suppose a meeting link to an online video conference that is to transpire in the future has been shared amongst various attendees of the conference. This might have been done through email, through short message service (SMS) text message, or through another type of communication channel, and may have been instigated by a presenter or organizer of the conference. Then at the arranged conference start time, the meeting link may be selected by each respective attendee at their own respective client device to launch locally-stored video conferencing software or to otherwise access the video conference itself (e.g., using a web-based platform).

Suppose, for example, that an attendee named John selected the link via his smartphone display. This in turn may cause a locally-stored version of the video conferencing software to launch at John's device for John to actually login. Note here that logging in may include simply connecting/logging on to enter or join the video conference, or in some examples may include additional steps such as authentication steps for John to enter a username and password or other information to access the video conference.

Upon login, John may then be presented with the GUI 300 shown in FIG. 3. As shown in FIG. 3, the GUI 300 may include respective real-time video streams/feeds 302, 304 of other video conference attendees that are remotely-located from John and that are also logged in with their own respective client devices. In this example the attendees are named Fred and Tim. Also note for completeness that while the video feeds 302, 304 are being presented, audio from microphones on Fred and Tim's devices may also be presented at John's smartphone through its speaker(s) so that John can hear what Fred and Tim are saying. Thus, more generally note that audio/video (AV) data and metadata (e.g., name, contact info, etc.) of each attendee may be routed to other attendees for video conferencing consistent with present principles.

Continuing with this example, suppose however that based on input from one or more sensors, John's smartphone and/or a coordinating server that might be routing the A/V data between the client devices determines that while only John and two other people—Tim and Fred—are actively logged in to the video conference using the link that was shared (e.g., determines that three discrete client devices in total are connected to the video conference), additional attendees greater than the number of total logins have been detected through sensor input. In response, John's smartphone and/or the server may add, if available, video feeds 306, 308 to the GUI 300 of the additional attendees that were detected via the sensor input.

For example, the same camera imaging Fred may also show an unknown "first" attendee within the same field of view, as determined based on object and/or facial recognition. Based on this, the raw feed or other video feed from the camera may be segmented using image processing software so that the video feed 302 only shows a partial field of view/partial frames from the camera that shows Fred's face but not the first attendee's face, and so that video feed 306 only shows a partial field of view/partial frames from the same camera that shows the unknown attendee's face but not Fred's face. Or if Fred's client device has multiple cameras or can stream input from other cameras located elsewhere in Fred's local environment, and one of those other camera feeds shows the unknown first attendee, then that feed may be presented as feed 306 instead (while only Fred continues to be shown in the feed 302). A camera on a hub device or other video conferencing device also located within Fred's environment might be similarly used to stream video of the unknown first user for presentation as feed 306. Also note that in some examples, rather than presenting a video feed of the first unknown attendee from one of those cameras, a still image of the first unknown attendee as received from one of those cameras may be statically presented throughout the video conference.

Further note that these same techniques may also be used for a second non-logged-in attendee that has also been detected via sensor input, as reflected in feed 308. The second non-logged-in attendee might be co-located with Tim at a certain geolocation, for example.

Thus, according to this example the feeds 306, 308 themselves may establish graphical indications of respective people determined to be attending the video conference but not associated with a login to the video conference. However, additional graphical indications may also be presented, such as a text indication 310 of a placeholder or generic name for the first detected but still unknown attendee (e.g., "unknown", "user 4", etc.).

As also shown in FIG. 3, the indication 310 may include still other information that may be determined from one or more sensors, such as the first unknown attendee's local, real-world positioning with respect to another attendee that is known and logged in (Fred here, as may be identified through facial recognition and correlated to a device ID logged in to the conference and already registered to Fred). Accordingly, in the present example text indication 310 indicates that the unknown first attendee is at Fred's real-world geolocation to the right of Fred (e.g., relative to the field of view of the camera providing the feed(s) 302/306). This real-world positioning with respect to Fred may therefore be determined using computer vision and/or other image processing software to analyze the positional relationship as indicated via the feed(s) 302/306. Infrared (IR) proximity sensors and time of flight sensors might also be used for determining the positioning of these two people with respect to each other, as may a microphone array and beamforming to localize different sources of sound/spoken words. Sensors of other types may also be used.

Furthermore, if the real-world distance between these two people at the common geolocation can be determined from the sensor input as well (e.g., using computer vision), the indication 310 might also indicate the distance between the two people. For example, the indication 310 might indicate that the first unknown user is "ten feet from Fred, to Fred's right".

Additionally, if desired in some examples the indication/feed 306 may also have a text entry field 312 overlaid on it. The field 312 may be used for another attendee (in this case, John) to direct text input to establish a custom or specific name for the unknown first attendee shown in the corresponding video feed 306. Then after the desired text is entered into the field 312 using a hard or soft keyboard or other method like voice dictation, the attendee (again, John in this example) may select the save selector 314 to save the designated name and provide it to the conferencing system as may be executing locally and/or at the coordinating server for the designated name to ultimately be routed as metadata to all other attendees for presentation using their own similar video conference GUIs (as well as presentation on John's GUI 300). Also if desired, John may select a more selector 316 to provide still other information to the conferencing system about the unknown first attendee, which in turn may command John's device/the conferencing system to present another GUI like the GUI 400 of FIG. 4 that will be described shortly.

But still in reference to FIG. 3 for now, further note as indicated above that the feed 308 may itself establish a graphical indication of the second attendee that was detected via sensor input but determined to not be logged in to the conference with a separate personal device. Additional graphical indications may also be presented for this second attendee as well, such as a text indication 318 of an actual name of this attendee, which in the present example is "Nancy D." The text indication 318 may also indicate contact information such as an email address as shown, but other contact info may be presented as well, such as telephone number, mailing address, etc. The text indication 318 may also include a description of who else's login this second attendee is using to participate in the video conference, which is Tim's login here, and though not shown for simplicity the indication 318 might also indicate Nancy's real-world positioning with respect to the location of Tim similar to as described above. As also shown in FIG. 3, the indication 318 may also indicate that this second non-logged-in attendee (Nancy) has been identified through facial recognition (e.g., using the video feed from the camera on Tim's client device or another camera in communication with the conferencing system). If another method besides facial recognition was used to identify Nancy, that method might be indicated as well.

Returning to the contact information mentioned above, note that based on the facial recognition or other type of user identification such as voice recognition/ID and others disclosed herein, the name of the respective attendee may be identified for the conferencing system to then lookup additional metadata like contact information or even job title, company name, etc. That metadata may be stored in a relational database associating the person's name with such information, and once found that metadata may be fed to all other attendee client devices for presentation at their own respective conference GUIs that may be similar to the GUI 300.

Still describing FIG. 3, although not shown for simplicity further note that graphical elements similar to the elements 312-316 may also be overlaid on the video feed 308 of Nancy for John or another attendee to specify customizable information about Nancy, such as a nickname or other information as will now be described in reference to FIG. 4.

Figure 4:
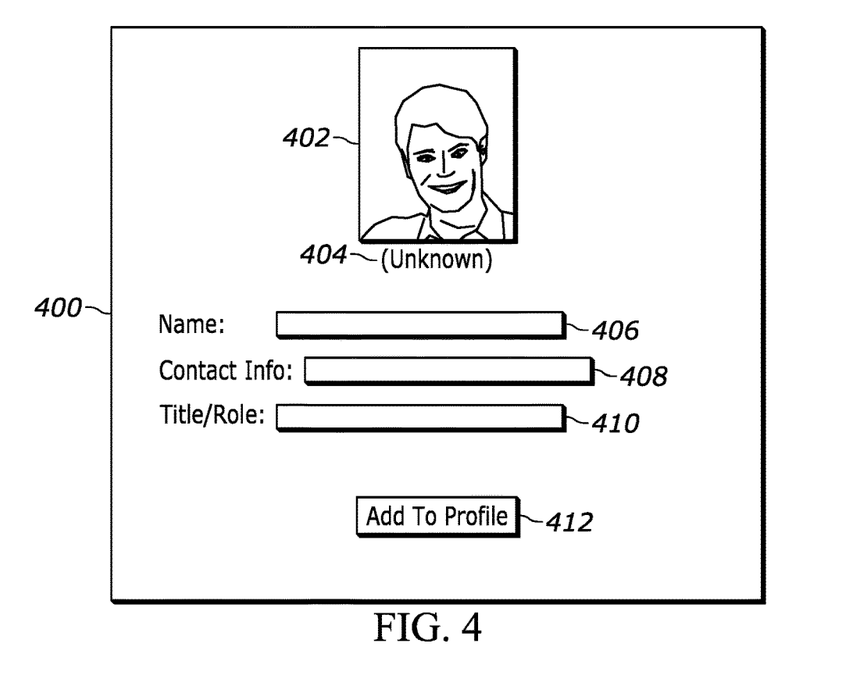
FIG. 4 shows an example GUI that may be used for another person to identify a detected participant of a video conference consistent with present principles.

Accordingly, as shown in FIG. 4, a GUI 400 may be presented on the display of John's smartphone or other device and show a real-time video feed 402 of the relevant respective attendee. In this case, the attendee in the feed 402 is the unknown first attendee also shown in the feed 306, and the feed 402 may therefore be the same or a different real-time feed than the feed 306 but in either case shows the first unknown attendee. Text 404 may also be presented to indicate the currently-assigned placeholder name for the unknown first attendee as well.

As also shown in FIG. 4, the GUI 400 may include a text entry field 406 into which a customizable name may be entered for the unknown first attendee, a text entry field 408 into which one or more pieces of contact information may be entered for the unknown first attendee, and a text entry field 410 into which one or more titles or roles such as job titles or job responsibilities may be entered for the unknown first attendee. Then once the desired information is entered into one or more of the fields 406-410, the user may select the selector 412 to add the information to a temporary profile that exists or is being created for the first unknown user. The profile may then be used to denote an additional login to the video conference itself as described herein. As such, the information entered into the fields 406-410 may also be taken from the temporary profile and presented as to other conference attendees as one or more graphical indications as described above in reference to FIG. 3. The temporary profile itself may reside in RAM for the conferencing service, such as RAM at John's smartphone or RAM on the coordinating server. The temporary profile may then be dumped from RAM or otherwise deleted responsive to conclusion of the video conference, but in some circumstances the data from the profile regarding the associated conference attendee themselves may be stored in persistent storage accessible to the system for use in subsequent video conferences.

Figure 5:
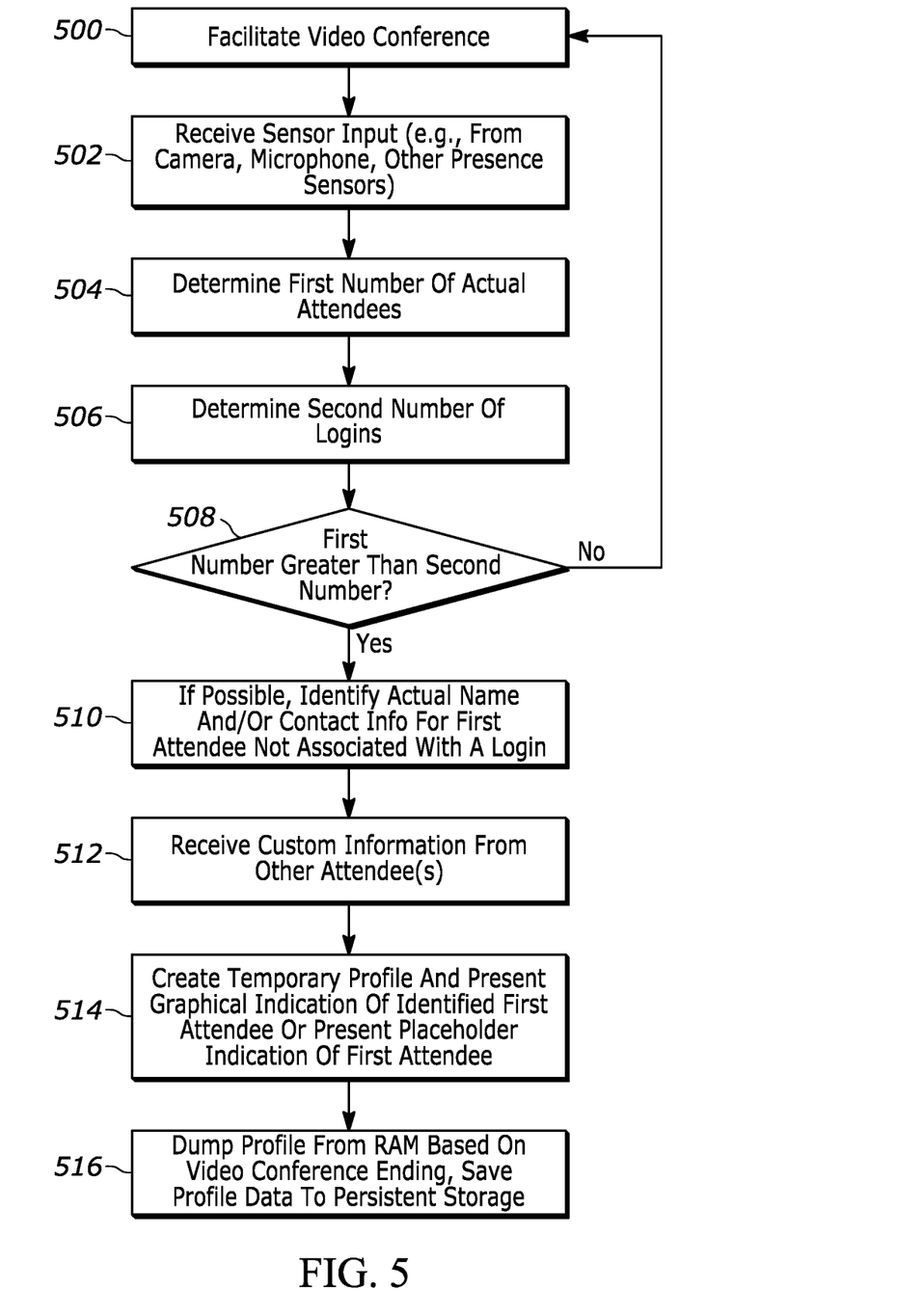
FIG. 5 illustrates example logic in example flow chart format that may be executed by a device/video conferencing system consistent with present principles.

More about this process will now be described in reference to FIG. 5. This figure shows example logic that may be executed by one or more devices such as the system 100 in accordance with present principles. Thus, note that one or more of the steps in the logic below may be executed by one or more client devices and/or coordinating servers in any appropriate combination. Also note that while the logic of FIG. 5 is shown in flow chart format, other suitable logic may also be used.

Beginning at block 500, the device may facilitate a video conference by transmitting A/V content and metadata between conferencing devices, such as a client device transmitting its local A/V data to others and receiving the A/V data of other attendees for local presentation. Or at block 500 a coordinating server may route the A/V communications between the devices, possibly control one or more conferencing-related GUIs as presented locally at client devices of the respective attendees, etc. From block 500 the logic may then proceed to block 502.

At block 502 the device may receive input from one or more sensors on or in communication with the device. For example, camera input from one or more cameras on client devices may be received at block 502, as may microphone input from one or more local microphones. The one or more sensors from which input is received may also include other presence sensors such as one or more infrared (IR) transceivers, one or more ultrasonic transceivers, and/or one or more time of flight sensors like IR time of flight transceivers and lidar time of flight transceivers specifically. In some example implementations, the sensors may also include one or more wireless communication transceivers for identifying discrete users based on device ID received wirelessly.

From block 502 the logic may then proceed to block 504 where the device may determine an actual number of attendees from the sensor input received at block 502 (sometimes referred to as a "first number" below). For example, if camera input is received at block 502 then at block 504 the device may execute object and/or facial recognition using the input to identify how many distinct people can be seen within the fields of views of the cameras from which input is received. Facial recognition may also be used to identify the name of the respective attendee based on preregistered facial data to ultimately present the identified name to other participants or, if an actual name cannot be determined, present a placeholder name as assigned to the person.

Furthermore, even though names may not necessarily be identifiable based on other types of presence sensor input such as input from ultrasound or IR transceivers, these sensors as located on client devices (including, for example, a conferencing room hub device that another person like Tim might have used to login) may still be used to disambiguate distinct people from each other at each location of a respective device that is logged in for conferencing. This may be done based on positional information reported by the sensor(s) as processed using one or more spatial analysis algorithms, 3D mapping algorithms, ranging algorithms, etc. to correlate different detected shapes at different areas as corresponding to different people.

Signals received at a wireless transceiver or other network transceiver may also be parsed for information indicating distinct people, where the received signals may be provided by each person's own respective client device. For example, each person may have a smartphone with them that might be broadcasting wireless Bluetooth or Wi-Fi communications indicating device ID or even a user ID specifically (and/or that is providing the identifier(s) as metadata to other conferencing devices). The device executing the logic of FIG. 5 may thus disambiguate different attendees based on different media access control (MAC) addresses, internet protocol (IP) addresses, device serial numbers, unique user identifications (UUIDs), usernames, etc. as indicated in the received signals. The device may also possibly count itself as a distinct attendee for the relevant logged-in user (e.g., if the logic is being executed by a client device) to arrive at a total number of actual attendees.

As a specific example, each different address or identifier of a certain type (e.g., MAC address) that is identified by the device may be counted as a different attendee and possibly added to a count that already includes the device executing some or all of the logic of FIG. 5 if that device is a client device. Or the addresses or other identifiers identified from the received signals may be compared to a database of already-registered identifiers to identify different users already registered in the database as being associated with one or more of the detected identifiers. Also note that where the signals are received wirelessly, the wireless communications themselves may be Bluetooth communications, ultra-wideband communications, IR communications, near-field communications (NFC), Wi-Fi communications, or any other suitable wireless communication type.

Still in reference to block 504, in addition to or in lieu of the above, input from one or more microphones may also be parsed using voice recognition to disambiguate how many distinct people are picked up by the various microphones being used for the video conference. The voice recognition/ID may even be used to identify the actual name of the respective attendee based on preregistered voice data to then present the actual name to other participants or, if an actual name cannot be determined, present a placeholder name as assigned to the person.

As another example using microphone input, a digital assistant specifically may be used to disambiguate different voices and hence different people from the microphone input even if different specific identities cannot be determined. The digital assistant might be Apple's Siri, Amazon's Alexa, or Google's Assistant, for example. Additionally, in some examples the digital assistant and/or other voice processing software, including possibly speech-to-text software and natural language understanding software, may be used to parse the microphone input (e.g., from the audio itself or as transcribed to text) for different attendees that might verbally identify themselves or that might otherwise be verbally indicated. This might occur during verbal introductions of attendees during the video conference, for example, and hence the device may be able to disambiguate different people based on the number of different names announced or referenced as being present for the conference.

Still in reference to FIG. 5, from block 504 the logic may proceed to block 506. At block 506 the device may determine a number of distinct logins to the video conference itself (sometimes referred to as a "second number" below). Here the device may simply access the video conference's metadata indicating how many devices are currently connected for conferencing, or the number of logins may be looked up elsewhere as well. Thereafter the logic may proceed to decision diamond 508.

At diamond 508 the device may determine whether the first number is greater than the second number, indicating an additional number of attendees actually present for the video conference compared to the number of client devices logged in. Thus, a determination that the first number is not greater than the second number may cause the logic to revert back to block 500 and proceed therefrom. However, a determination that the first number is greater than the second number may instead cause the logic to proceed to block 510.

At block 510 the device may, if possible and if the device has not already done so per the description above, identify a preregistered name associated with each additional attendee that does not correspond one to one to a logged-in device. At block 510 the device may even identify the name of logged-in attendees to disambiguate from other attendees. The device may do so using facial recognition, voice identification, etc. as described herein. Then, also at block 510, once a preregistered name has been identified for each non-logged-in attendee, other metadata about the attendee may also be looked up from a database or other accessible storage, such as various types of contact information, job titles, projects worked on, hobbies, or other unique or somewhat unique aspects about the respective attendee as stored in metadata.

From block 510 the logic may proceed to block 512. At block 512 the device may receive and store custom information to associate with a disambiguated but possibly still unknown attendee, such as information entered into one of the fields 312 or 406-410 described above. The custom information that might be identified/received at block 512 for the relevant attendee may also be stored to persistent storage (e.g., in a persistent profile for the attendee for use in future conferences without having to be entered by another person again).

Additionally or alternatively, at block 514 the information received at block 512 may be stored in a temporary profile for the relevant attendee as created for the current video conference to thus use that profile as a placeholder for which video data is presented on a GUI like the GUI 300 for the distinct user (while that attendee's audio data may also be mixed into the conference audio as well). Note that this temporary profile may be in addition to respective profiles (temporary or otherwise) for each login/attendee already logged in to the video conference. Also note that at block 514 the device may present other graphical indications as described herein, including others described above in reference to the GUI 300.

From block 514 the logic may then proceed to block 516. At block 516 the device may monitor the video conference and then, responsive to the conference concluding, dump, delete, or otherwise cease to maintain the temporary attendee profile(s) that were created (e.g., a placeholder profile with placeholder name like "unknown") and might have been maintained in RAM. However, if desired and if the device has not done so already, the device may also save the relevant attendee's data from the temporary profile to persistent storage.

Also note that the data that may be stored to persistent storage at block 516 might include facial data that can be used for future facial recognition/disambiguation, voice data that can be used for future voice identification/disambiguation, or other types of data including those described above which can nonetheless be used for future identifications/disambiguations of distinct people in later-transpiring video conferences. This identifying data might even be linked in the persistent storage to a customized name or other identifier designated by another conference attendee as described above so that the next time another video conference transpires, even if the actual name of the relevant attendee is still unknown, the customized or assigned name may still be presented to others upon recognizing the attendee's face, voice, or other distinguishing characteristic (e.g., device ID) using the data stored at block 516. And note that the persistent storage itself may be hard disk drive (HDD) storage, solid state storage, certain flash memory storage, or another type of persistent storage.

Figure 6:
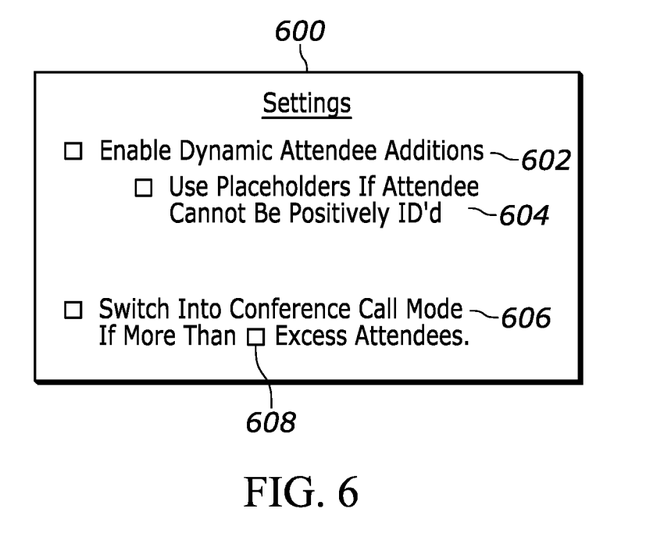
FIG. 6 shows an example GUI that may be presented on a display for configuring one or more settings of a device/conferencing system to operate consistent with present principles.

Now describing FIG. 6, it shows an example settings graphical user interface (GUI) 600 that may be presented on a display of a client device or even display of a server to configure one or more settings of a conferencing system, service, or software used consistent with present principles. For example, the GUI 600 may be presented on a display of the device undertaking the logic of FIG. 5, a display of an end-user's own client device, and/or the display of a system administrator's device.

The settings GUI 600 may be presented to set or enable one or more settings of the device or conferencing system to operate consistent with present principles. For example, the GUI 600 may be reached by navigating a main settings menu of the device or its operating system, or a settings menu for a particular video conferencing software application. Also note that in the example shown, each option or sub-option discussed below may be selected by directing touch or cursor input to the respective check box adjacent to the respective option.

As shown in FIG. 6, the GUI 600 may include an option 602 that may be selectable a single time to set or configure the device, system, software, etc. to undertake present principles in multiple future instances, such as executing the functions described above in reference to FIGS. 3-4 and executing the logic of FIG. 5 for different video conferences in the future.

The GUI 600 may also include a sub-option 604 that may be selectable to specifically set the device to present generic placeholder names for attendees identified as attending the conference but that are in excess of the number of logged in users or that are otherwise not associated with a particular login.

As also shown in FIG. 6, the GUI 600 may include an option 606 that may be selectable to set the device to switch from video conferencing mode (in which a separate video feed is presented at a given client device for each detected/logged in attendee that is remote from that client device) to audio conference call mode once a threshold number of total actual attendees is reached. This may be helpful to not clutter the screen with too many video feeds of others and to also reduce processing and bandwidth constraints that might be put on the conferencing system/devices in such situations. Accordingly, a user may also direct numerical input to input box 608 to establish the threshold number. And note that the audio conference call mode itself may include not presenting real time video feeds for additional attendees beyond the threshold number (or any attendees) and instead only presenting audio of the different attendees for others to hear.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least one computer readable storage medium (CRSM) that is not a transitory signal, the at least one computer readable storage medium comprising instructions executable by at least one processor to:
    determine whether a first number of video conference attendees detected via input from one or more sensors is greater than a second number of logins to the video conference; and
    responsive to determining that the first number is greater than the second number, present a graphical element on a display during the video conference, the graphical element indicating a first attendee that is detected via the one or more sensors but that is not associated with a login to the video conference.

2. The at least one CRSM of claim 1, wherein the instructions are executable to:
    responsive to determining that the first number is greater than the second number, create a temporary attendee profile for the video conference, the temporary attendee profile being in addition to respective profiles for each login to the video conference.

3. The at least one CRSM of claim 1, wherein the input is first input, and wherein the instructions are executable to:
    during the video conference, receive second input to a graphical user interface (GUI), the second input indicating an identifier for the first attendee as designated by a second attendee using the GUI; and
    based on receiving the second input, include the identifier as part of the graphical element.

4. The at least one CRSM of claim 1, wherein the instructions are executable to:
    responsive to determining that the first number is greater than the second number and responsive to not being able to identify the first attendee by name using the input, present a placeholder indication on the display, the placeholder indication indicating the first attendee but not by name.

5. The at least one CRSM of claim 1, wherein the instructions are executable to:
    identify the first attendee by name based on the input;
    determine contact information for the first attendee based on the identifying of the first attendee by name; and
    include the contact information in an attendee profile for the first attendee.

6. The at least one CRSM of claim 1, wherein the instructions are executable to:
    identify the first attendee by name based on the input;
    determine contact information for the first attendee based on the identifying of the first attendee by name; and
    present the contact information on the display.

7. The at least one CRSM of claim 6, wherein the input comprises microphone input from a microphone establishing at least one of the one or more sensors.

8. The at least one CRSM of claim 6, wherein the input comprises camera input from a camera establishing at least one of the one or more sensors.

9. A device, comprising:
    at least one processor; and
    storage accessible to the at least one processor and comprising instructions executable by the at least one processor to:

determine whether a first number of video conference attendees detected via input from one or more sensors is greater than a second number of logins to the video conference; and responsive to determining that the first number is greater than the second number, present a graphical element on a display during the video conference, the graphical element indicating a first attendee that is detected via the one or more sensors but that is not associated with a login to the video conference.

10. The device of claim 9, comprising the display.

11. The device of claim 9, wherein the instructions are executable to:

responsive to determining that the first number is greater than the second number, create a temporary attendee profile for the video conference, the temporary attendee profile being in addition to respective profiles for each login to the video conference.

12. The device of claim 9, wherein the input is first input, and wherein the instructions are executable to:

during the video conference, receive second input to a graphical user interface (GUI), the second input indicating an identifier for the first attendee as designated by a second attendee using the GUI; and based on receiving the second input, include the identifier as part of the graphical element.

13. The device of claim 9, wherein the instructions are executable to:

responsive to determining that the first number is greater than the second number and responsive to not being able to identify the first attendee by name using the input, present a placeholder indication on the display, the placeholder indication indicating the first attendee but not by name.

14. The device of claim 9, wherein the instructions are executable to:

identify the first attendee by name based on the input;

determine contact information for the first attendee based on the identifying of the first attendee by name; and present the contact information on the display.

15. The device of claim 14, wherein the one or more sensors comprise a microphone, wherein the device comprises the microphone, and wherein the input comprises input from the microphone.

16. The device of claim 14, wherein the one or more sensors comprise a camera, wherein the device comprises the camera, and wherein the input comprises input from the camera.

17. A method, comprising:

determining whether a first number of video conference attendees detected via input from one or more sensors is greater than a second number of logins to the video conference; and responsive to determining that the first number is greater than the second number, presenting a graphical element on a display during the video conference, the graphical element indicating a first attendee that is detected via the one or more sensors but that is not associated with a login to the video conference.

18. The method of claim 17, comprising:

responsive to determining that the first number is greater than the second number and responsive to not being able to identify the first attendee by name using the input, presenting a placeholder indication on the display, the placeholder indication indicating the first attendee but not by name.

19. The method of claim 17, comprising:

identifying the first attendee by name based on the input;

determining contact information for the first attendee based on the identifying of the first attendee by name; and including the contact information in an attendee profile for the first attendee.

20. The method of claim 17, comprising:

identifying the first attendee by name based on the input;

determining contact information for the first attendee based on the identifying of the first attendee by name; and presenting the contact information on the display.

\* \* \* \* \*